United States Patent [19]

Blankers et al.

[11] Patent Number: 5,726,968
[45] Date of Patent: Mar. 10, 1998

[54] ELECTRO-OPTICAL SCANNING DEVICE, HINGE ELEMENT FOR USE IN THE SCANNING DEVICE, AND OPTICAL PLAYER COMPRISING THE SCANNING DEVICE

[75] Inventors: Petrus J. Blankers; Gerardus L. C. Elders, both of Eindhoven, Netherlands

[73] Assignee: U.S. Philips Corporation, New York, N.Y.

[21] Appl. No.: 973,019

[22] Filed: Nov. 9, 1992

[30] Foreign Application Priority Data

Nov. 7, 1991 [EP] European Pat. Off. ............ 91202893

[51] Int. Cl.$^6$ .................. G11B 21/20; G11B 7/09
[52] U.S. Cl. ........................... 369/247; 369/44.16
[58] Field of Search ............... 369/44.15, 44.16, 369/247, 215

[56] References Cited

U.S. PATENT DOCUMENTS

| | | | |
|---|---|---|---|
| 4,669,823 | 6/1987 | Iguma et al. | 369/44.15 |
| 4,927,235 | 5/1990 | Narumi | 369/44.15 |
| 5,056,891 | 10/1991 | Masunaga | 369/44.15 |
| 5,073,882 | 12/1991 | Sasaki | 369/44.15 |
| 5,199,014 | 3/1993 | Homburg et al. | 369/44.15 |

FOREIGN PATENT DOCUMENTS

| | | |
|---|---|---|
| 0212941 | 4/1987 | European Pat. Off. . |
| 0148151 | 8/1984 | Japan . |
| 6124034 | 2/1986 | Japan . |

Primary Examiner—Stuart S. Levy
Assistant Examiner—George Joseph Letscher
Attorney, Agent, or Firm—Daniel E. Tierney

[57] ABSTRACT

An electro-optical scanning device comprises a lens (2) having an optical axis (2a), which lens is movable in a focusing direction (F), related to the optical axis, to form at least one radiation spot on a surface to be scanned, and in a tracking direction (T), oriented transversely of the focusing direction, to follow a recording track. The scanning device comprises a stationary section (16) having first actuator means and a movable section (6) having second actuator means, which movable section is movable relative the stationary section and carries said lens, which actuator means cooperate electromagnetically with one another via an air gap (20) in order to drive the lens. The movable section is secured to the stationary section by elastically deformable suspension means. The suspension means comprise two frame-shaped hinge elements (22) which extend parallel to one another and which are oriented transversely of a plane defined by the focusing direction and the tracking direction, which hinge elements each comprise two plastics fixing members (27a, 27b) and two elongate metal supporting members (25) extending between and embedded in the fixing members.

10 Claims, 3 Drawing Sheets

ELECTRO-OPTICAL SCANNING DEVICE, HINGE ELEMENT FOR USE IN THE SCANNING DEVICE, AND OPTICAL PLAYER COMPRISING THE SCANNING DEVICE

BACKGROUND OF THE INVENTION

The invention relates to an electro-optical scanning device comprising a movable lens having an optical axis, which lens is movable in a focusing direction, related to the optical axis, to form at least one radiation spot on a surface to be scanned, and in a tracking direction, oriented transversely of the focusing direction, to follow a recording track in said surface, and comprising a stationary section having first actuator means and a movable section having second actuator means, which movable section is movable relative the stationary section and carries said lens, which actuator means cooperate electromagnetically with one another via an air gap in order to drive the lens, the movable section being secured to the stationary section by elastically deformable suspension means.

Such a scanning device is known from EP-A 0,212,941 (herewith incorporated by reference). The known electro-optical scanning device has an objective lens mounted in a holder, which is movably secured to a supporting body by means of a coupling unit. The coupling unit comprises one pair of parallel blade springs having one end secured to a mounting block and having another end glued to a plastics element having one integral hinge via which it is secured to the lens holder. The pair of blade springs serves for guiding the objective lens in the focusing direction and the hinge allows rotational movements of the objective about an axis parallel to the optical axis in order to realise tracking movements. The known device further comprises a twin drive system which at opposite sides of the coupling unit comprises a magnet, a focusing coil and two tracking coils, the coils extending in comparatively wide magnetic air gaps. The known device is intended for optically scanning a track of an optical disc.

A disadvantage of the known scanning unit is that the objective lens performs rotational movements during tracking, which causes the position of the scanning spot relative to the track being scanned to be changed. Particularly in the case of a scanning spot composed of a plurality of spots this may be problematic. Another disadvantage is that assembly of the coupling unit, in particular, mounting of the blade springs, is a rather laborious operation.

SUMMARY OF THE INVENTION

It is an object of the invention to improve a scanning device of the type defined in the opening paragraph so as to obtain a scanning device which can be manufactured accurately and easily and in which the lens performs accurately defined translational movements both during focusing and during tracking.

To this end the scanning device in accordance with the invention is characterised in that the suspension means comprise two frame-shaped hinge elements which extend parallel to one another and which are oriented transversely of a plane defined by the focusing direction and the tracking direction, which hinge elements each comprise two plastics fixing members and two elongate metal supporting members extending between and embedded in the fixing members, one of the fixing members being secured to the stationary section and the other being secured to the movable section.

The frame-shaped hinge elements are constructed and positioned relative to one another in such a manner that, in geometrical terms, a double parallelogram construction is obtained which functions as a parallel guide system in two directions. An advantage of this is that the lens of the scanning device can solely perform translational movements in the focusing direction and the tracking direction, so that the position of the scanning spot relative to the track to be scanned is not changed during focusing and scanning.

In the scanning device in accordance with the invention the metal supporting members are used at least for the parallel guidance of the lens in the tracking direction. An advantage of this is that even after prolonged use and use under extreme conditions, such as at high ambient temperatures, the position of the lens relative to the tracks of the medium to be scanned is accurately maintained. This is important because conventional scanning systems have no reference for the radial position of the objective lens. Alternatives, for example plastics hinges as used, for example, in the device disclosed in EP-A 0,212,941, have the disadvantage that the plastics exhibits creep effects, particularly at higher temperatures. Since most scanning systems use the position of the medium to be scanned as a reference for the lens position in the focusing direction, it is generally permissible to use plastics hinges for the focusing movements.

A further advantage of the scanning device in accordance with the invention resides in the simple and easy-to-automate manufacture and mounting of the hinge elements.

An embodiment of the scanning device in accordance with the invention is characterised in that the fixing members comprise integrated hinges having connecting portions in which the supporting members are embedded, the supporting members being blade springs which are flexible in the tracking direction and rigid in the focusing direction, the hinges each having a hinge axis extending in the tracking direction.

By a suitable choice of the metal and the dimensions of the blade springs it is possible to obtain any desired natural frequency in the tracking directioh. A profiled shape of the blade springs may be favourable in this respect. In the case of audio or CD-I uses the natural frequency in the tracking direction will generally be between 30 and 55 Hz. In the case of CD-ROM uses for data storage, where the speed of rotation of the information medium during operation is higher, the natural frequency is generally between 70 and 80 Hz. Regardless of these natural frequencies the above embodiment also makes it possible to obtain any desired natural frequency in the focusing direction. The last-mentioned frequency will generally be between 20 and 35 Hz in audio or CD-I systems and between 50 and 65 Hz in data storage systems.

In a practical embodiment the hinges are constructed as integral hinges.

In another practical embodiment the blade springs extending between two fixing members are coplanar.

A simple embodiment is characterised in that the supporting members are wire springs. In this embodiment plastics integral hinges can be dispensed with. The desired resonant frequencies can be obtained by suitably dimensioning the wire springs. In this embodiment the wire springs can function as electrical conductors.

Preferably, the plastics used for the fixing members is a thermoplastics because of its damping properties. Suitable thermoplastic materials are, for example, block copolymers with a hard segment of polybutylene terephtalate and a soft segment based on long-chain polyether glycols.

Another embodiment of the scanning device in accordance with the invention, in which the stationary section comprises a permanent magnet and the movable section comprises a focusing coil and a tracking coil, which coils extend into the air gap, is characterised in that the focusing coil has a coil axis extending parallel to the optical axis and the air gap is oriented in accordance with a plane defined by the focusing direction and the tracking direction, the hinge elements being disposed at least substantially at one side of the air gap and the lens at the other side of the air gap, and the mass centre of the movable section being situated within or at least near the air gap.

In this embodiment the lens is in a cantilevered position relative to the coils. An advantage of this is that when built into an optical player, for example a CD player, a CD-I player or a CD-ROM player, the scanning device creates a space suitable for accommodating optical components cooperating with the scanning device, such as a semiconductor laser. By means of this scanning device in accordance with the invention it is fiather possible to obtain a small dimension viewed along the optical axis. As a result of the special arrangement of the focusing coil this coil functions as a counter-mass, enabling a well-balanced construction to be obtained in a simple manner. The point of application of the driving forces is then situated in or near the mass centre of the movable section in order to counteract the formation of parasitic resonances. A further advantage of the present scanning device is that the scanning device can be manufactured from a comparatively small number of easy-to-assemble parts.

A modification of the preceding embodiment, in which the stationary section comprises a permanent magnet and the movable section comprises a focusing coil and a tracking coil, which coils extend into the air gap, is characterised in that the focusing coil has a coil axis extending parallel to the optical axis and the air gap is oriented in accordance with a plane defined by the focusing direction and the tracking direction, the lens being situated in an area bounded by the hinge elements. This embodiment can be of very compact construction.

The invention further relates to a hinge element for use in the scanning device in accordance with the invention. Preferably, the supporting members of the hinge element are made of a non-magnetic material such as non-magnetic stainless steel or phosphor-bronze. The hinge element can be manufactured by means of an injection-moulding die, the metal supporting members being accurately positioned in a die cavity and being accurately clamped in position, after which the fixing elements are moulded.

The invention also relates to an optical player comprising the electro-optical scanning device in accordance with the invention, a turntable and a slide, the slide carrying the scanning device and being movable along a radial path relative to the turntable. The player may be, for example, a CD player, a CD-I player or a CD-ROM player.

The invention will now be described in more detail, by way of example, with reference to the drawings.

BRIEF DESCRIPTON OF THE DRAWING

FIG. 1 is an exploded view of a first embodiment of the scanning device in accordance with the invention, FIG. 2 is a sectional view of the embodiment shown in FIG. 1, FIG. 3 is a perspective view of a player in accordance with the invention, comprising a second embodiment of the scanning device, FIG. 4 shows a hinge element of a third embodiment of the scanning device, and FIG. 5 shows diagrammatically the third embodiment.

DESCRIPTION OF THE PREFERRED EMBODIMENT

Figure 1:
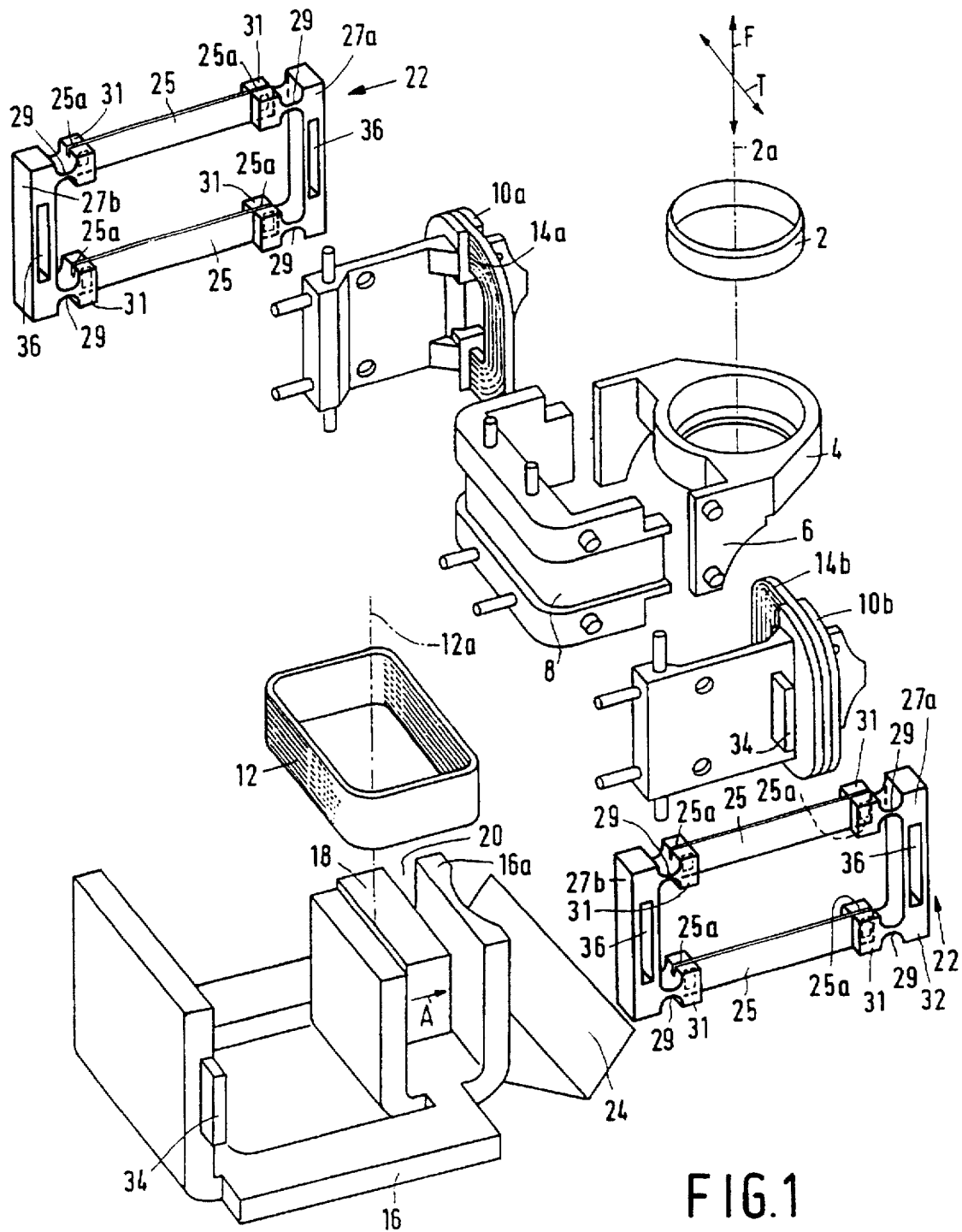

The electro-optical scanning device in accordance with the invention is a so-called 2D actuator and is intended for use in CD decks constructed for two-stage radial tracking of optical discs, for example CDs of 8 or 12 cm diameter and/or magneto-optical discs. In such a deck an objective can be translated along a radial path relative to a disc which is rotatable about an axis of rotation. For this purpose the deck comprises, for example, a translatable slide carrying the scanning device. By means of a radiation beam obtained from a laser and directed to the scanning device an information track of a rotating disc-shaped medium can be written and/or read without mechanical contact.

The scanning device in accordance with the invention is constructed in such a manner that the production can be automated almost fully in order to manufacture large quantifies at minimal cost and is particularly suitable for use in so-called slim-line equipment.

The scanning device comprises an objective lens 2 mounted in a lens holder 4 and having an optical axis 2a. The lens holder 4 forms part of a movable section 6 of the scanning device, which movable section further comprises a focusing-coil holder 8 and two tracking-coil holders 10a and 10b. The coil holders 8, 10a and 10b are connected to one another and to the lens holder 4, in the present example by means of snap-in connections. The focusing-coil holders 8 are provided with a focusing coil 12 having a coil axis 12a parallel to the optical axis 2a. The tracking-coil holders 10a and 10b are each provided with a tracking coil 14a and 14b respectively.

The scanning device in accordance with the invention further has a stationary section 16 comprising a permanent magnet 18 and ferromagnetic parts. The magnet 18, which has been magnetised as indicated by means of an arrow A, constitutes a magnetic circuit with the ferromagnetic parts of the stationary section 16, a magnetic air gap 20 being formed between the magnet 18 and one of the ferromagnetic parts 16a.

The movable section 6 is movably connected to the stationary section 16 by means of two frame-shaped hinge elements 22, the focusing coil 12 and the tracking coils 14a and 14b extending partly into the air gap 20. The movable section, in particular the lens 2, is movable relative to the stationary section in a focusing direction indicated by a double arrow F and in a tracking direction indicated by a double arrow T.

When this embodiment is used in a device for translating an objective along a radial path relative to a rotating disc the laser, generally a semiconductor laser, may be arranged underneath the scanning device or adjacent the scanning device, as desired. In the last-mentioned case a mirror 24 is arranged in the light path underneath the lens 2.

The hinge elements 22 extend parallel to one another and each comprise two mutually parallel metal blade springs 25 and two plastics fixing members 27a and 27b of a thermoplastic elastomer. In the present example the thermoplastic elastomer is a block copolymer composed of a hard (crystalline) segment of polybutylene terephtalate and a soft (amorphous) segment based on long-chain polyether glycols and, as a result of this, it has suitable damping properties in order to suppress undesired vibrations, so that no additional damping measures, such as a damping coating on the blade springs, have to be provided. Each fixing member has two integral hinges 29 with connecting portions 31, in which the ends 25a of the blade springs 25 have been embedded by means of an injection-moulding machine.

The lens 2 has a neutral position in which the blade springs 25 are oriented transversely of the plane defined by the focusing direction F and the tracking direction T. The hinge members 22 are connected to the movable section 6 and the stationary section 16 by means of fixing members 27a and 27b respectively and in the present example projections 34 of the sections 6 and 16 engage in recesses 26 in the members 27a and 27b respectively. The blade springs 25 are oriented in such a way that movements of the part 2 in the tracking direction T are possible owing to elastic deformations of the blade springs. The blade springs are rigid in the focusing direction. The integral hinges 29 permit movements about an axis which extends in the tracking direction T. The focusing movements and tracking movements to be performed by the lens 2 are translations.

A satisfactory compromise has been found between the sensitivity to shocks originating from a source outside a slide carrying the scanning device of an optical or magneto-optical player, and the sensitivity to disturbances of the slide itself. This is particularly important if a slide-drive system is used. The suspension means themselves are particularly favourable on account of their reliability, their inherent damping characteristic and their simple manufacturing and assembly possibilities. In the assembled condition the scanning device in accordance with the invention is mounted on the slide in such a way that the magnetic gap 20 extends in a tangential direction relative to the disc to be scanned.

It has been found that both in the tracking direction and in the focusing direction the scanning device in accordance with the invention enables a high efficiency to be achieved because the mass to be moved is comparatively small and the ratio between the driving forces and the electric currents applied to the coils is favourable. The scanning device in accordance with the invention is therefore particularly suitable for low-power uses.

Figure 3:
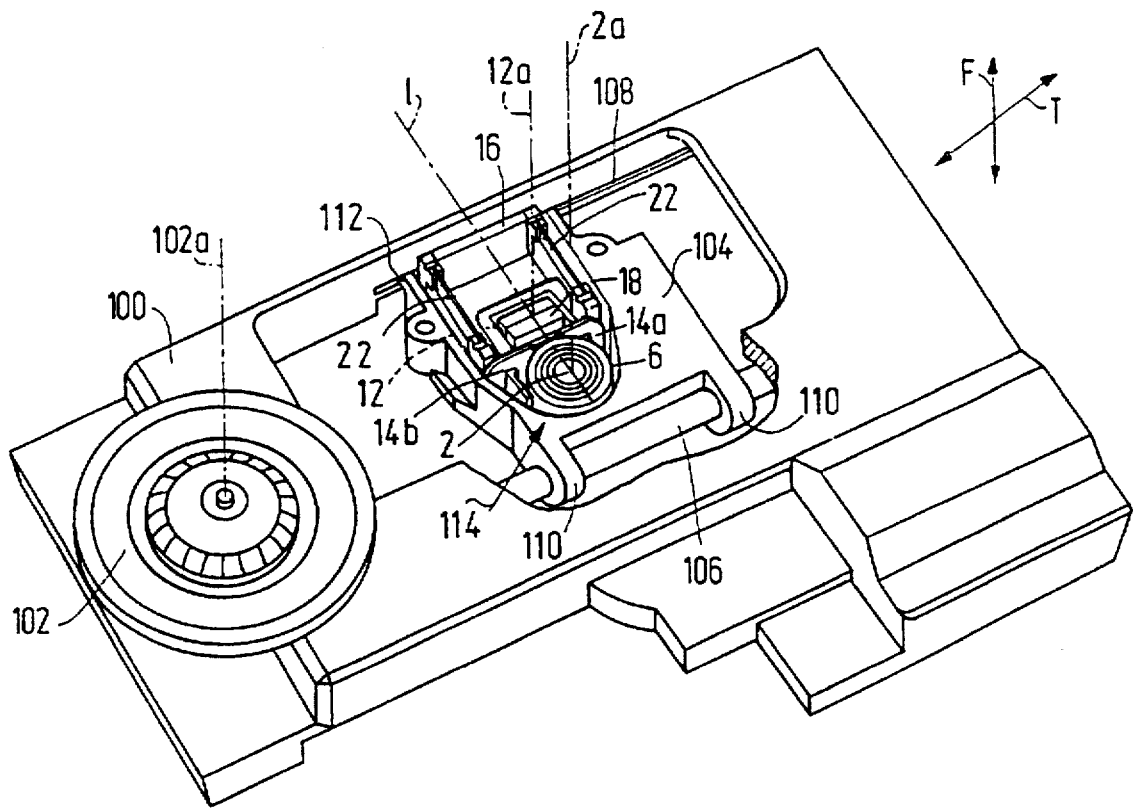

FIG. 3 shows a part of a CD player, in particular the deck of this player, employing a second embodiment of the device in accordance with the invention. Parts of this embodiment which correspond to parts of the embodiment described above bear the same reference numerals.

The deck shown in FIG. 3 comprises a chassis 100 carrying an electrically drivable turntable 102 for supporting and centring an optical disc having an information track, for example a CD, the turntable 102 being rotatable about an axis of rotation 102a. The deck further comprises mechanical guide means for translating a slide 104 in a radial direction (indicated by an arrow T) relative to the turntable 102. The guide means comprise, for example, a guide rod 106 secured to the chassis 100 and a guide wall 108 which are adapted to cooperate respectively with sliding sleeves 110 and sliding surfaces 112 of the slide 104. An electric motor, which is not shown and which is supported in the chassis, serves for driving the slide 104 directly or by means of a transmission mechanism.

Figure 2:
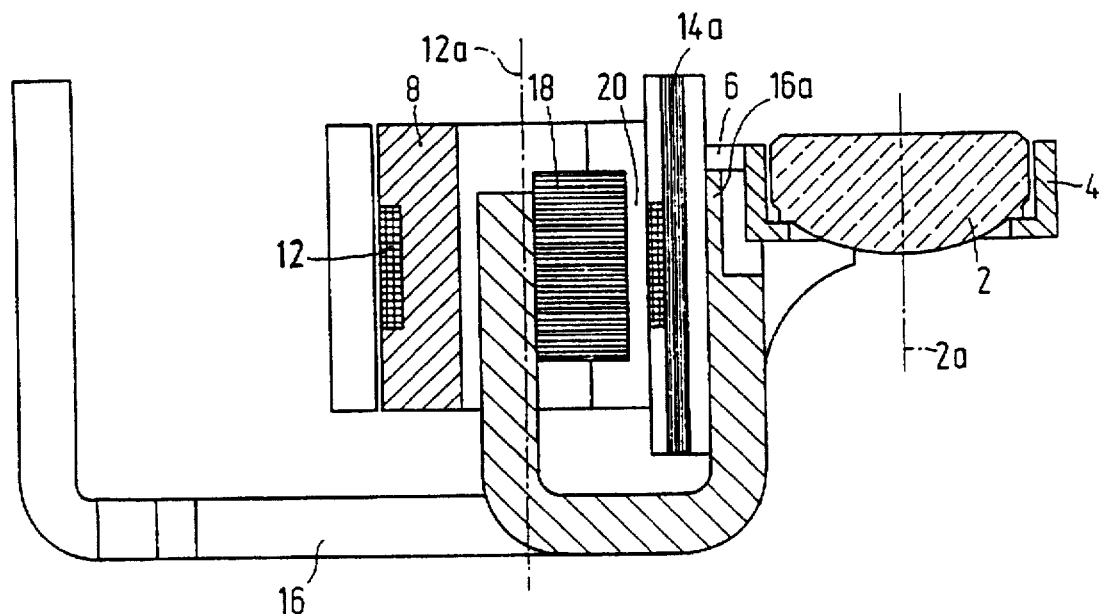

The slide 104 carries an embodiment 114 of the scanning device in accordance with the invention, in particular of the type as shown in FIGS. 1 and 2, and a semiconductor laser arranged adjacent the scanning device 114. The scanning device 114 comprises a movable section 6 comprising an objective 2 having an optical axis 2a parallel to the axis of rotation 102a, a focusing coil 12 having a coil axis 12a, and two tracking coils 14a, 14b. The movable section 6 is connected to a stationary section 16 of the scanning device 104 by means of two hinge elements 22, which stationary section is secured to the slide 104 and comprises a magnetic circuit with a permanent magnet 18. The hinge elements 22 are of a type as shown in FIG. 1. The scanning device is so positioned relative to the slide 107 that its longitudinal axis 1 is oriented transversely of a plane defined by the axis of rotation 102 and the optical axis 2a, thus enabling the objective 2 to be moved both in the focusing direction F and the tracking direction T.

In operation the slide 104 is moved along a radial path, indicated by the arrow T, relative to the axis of rotation 102a of the turntable 102 in order to achieve coarse tracking of an information track situated in an information plane of the rotating disc. Since the track may be slightly off-centred on the optical disc clamped on the turntable and may exhibit minor irregularities and since the turntable may also exhibit small radial deviations allowance is to be made for small radial excursions of the information track during rotation. The deviations which in operation may arise between the position of the scanning spot projected onto the disc by the objective and the position of the track portion to be scanned are reduced by means of a radial tracking system forming part of the scanning device 114 in that the objective 2 performs small high-frequency tracking movements as indicated by the arrow T.

Figure 4:
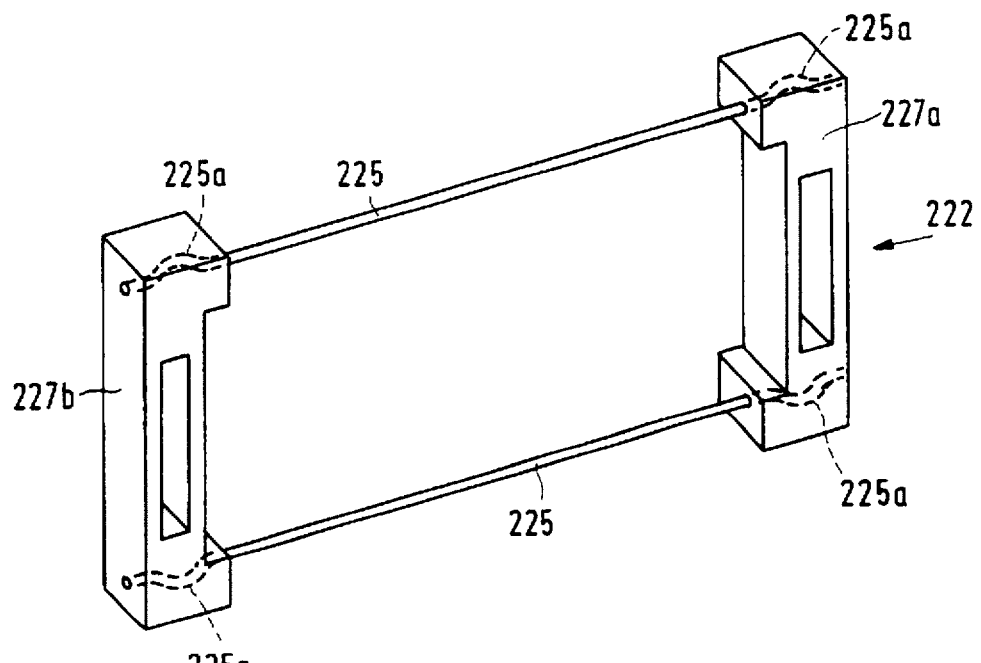

FIG. 4 shows a modification of the hinge elements 22. The hinge element 222 shown in FIG. 4 comprises two parallel metal wire springs 225 of round or rectangular cross-section having ends 225a embedded in two plastics fixing members 227a and 227b by means of an injection-moulding process.

Figure 5:
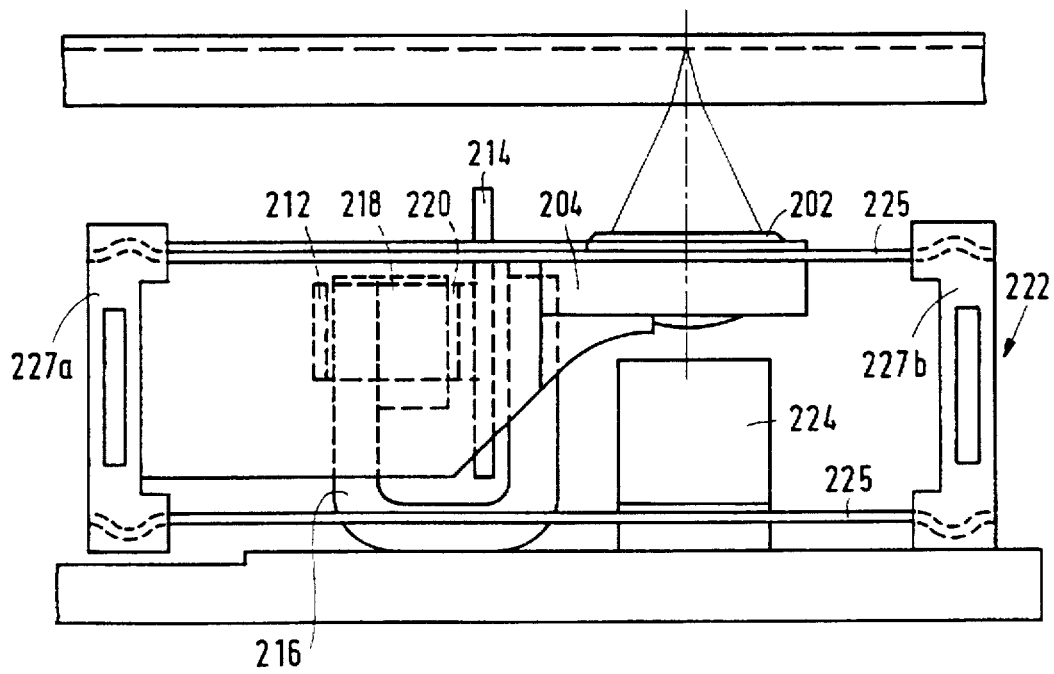

The scanning device in accordance with the invention shown in FIG. 5 employs two frame-shaped hinge elements 222 of the type as shown in FIG. 4. However, FIG. 5 shows only one of these hinge elements.

The scanning device comprises a lens holder 204 having a lens 202 to form a scanning spot on an optical disc 203. The lens holder 204 is secured to a movable section 206, which further carries a focusing coil 212 and tracking coils 214. The scanning device further comprises a stationary section 216 comprising a permanent magnet 218 and ferromagnetic parts. An air gap 220 is formed between the coils and the magnet. The movable section 206 is movably supported relative to the stationary section 216 by means of said two parallel hinge elements 222, whose fitting members 227a are secured to the movable section 206 and whose fixing members 227b are secured to the stationary section 216. Said wire springs 225 allow movements of the lens both in the focusing direction and in the tracking direction.

The lens 202 is situated between the stationary fixing members 227b and the movable fixing members 227a in a zone defined by the hinge elements 222. A mirror or prism 224 of an optical system can be arranged between the two hinge elements. The scanning device of this construction is very compact.

We claim:
1. An electro-optical scanning device comprising:
   a stationary section,
   a movable section,
   a lens having an optical axis, carried on said movable section,
   an elastically deformable suspension for securing said movable section to said stationary section, permitting relative movement of said lens in a focusing direction to form at least one radiation spot on a surface to be scanned, and a tracking direction oriented transversely of said focusing direction, and a first actuator carried on said stationary section, and a second actuator carried on said movable section, said actuators cooperating electromagnetically through an air gap to drive the lens, characterized in that said suspension comprises a double parallelogram guide system formed by two hinge frames extending parallel to one another, transversely to a plane defined by the focusing direction and the tracking direction, each hinge frame comprises two plastic fixing members and two elongate metal supporting members, each fixing member having a fixing portion, two connecting portions, and two integral hinges each connecting a respective one of said connecting portions to the fixing portion, each hinge having a hinge axis extending in the tracking direction; and said two supporting members being formed by two respective elongate metal blade springs extending between and embedded in two of said connecting portions respectively, said blade springs being flexible for movement in the tracking direction and rigid in the focusing direction.

2. An electro-optical scanning device as claimed in claim 1, characterised in that the blade springs, which extend between two fixing members, are coplanar.

3. An electro-optical scanning device as claimed in claim 1 characterised in that the blade springs have a profiled shape.

4. An electro-optical scanning device as claimed in claim 1, characterised in that the plastics fixing members have damping properties.

5. An electro-optical scanning device as claimed in claim 4, characterised in that the plastics is a thermoplastics material.

6. An electro-optical scanning device as claimed in claim 1, in which the stationary section comprises a permanent magnet and the movable section comprises a focusing coil and a tracking coil, which coils extend into the air gap, characterised in that the focusing coil has a coil axis extending parallel to the optical axis and the air gap is oriented in accordance with a plane defined by the focusing direction and the tracking direction, the hinge elements being disposed at least substantially at one side of the air gap and the lens at the other side of the air gap, and the mass centre of the movable section being situated within or at least near the air gap.

7. An electro-optical device as claimed in claim 1, in which the stationary section comprises a permanent magnet and the movable section comprises a focusing coil and a tracking coil, which coils extend into the air gap, characterised in that the focusing coil has a coil axis extending parallel to the optical axis and the air gap is oriented in accordance with a plane defined by the focusing direction and the tracking direction, the lens being situated in an area bounded by the hinge elements.

8. A hinge element for use in a scanning device as claimed in claim 1, in which the supporting members are made of a non-magnetic material.

9. A hinge element for use in a scanning device as claimed in claim 1, characterised in that the supporting members are embedded by means of an injection-moulding process.

10. A player comprising an electro-optical scanning device as claimed in claim 1, as well as a turntable and a slide, the slide carrying the scanning device and being movable along a radial path relative to the turntable.

* * * * *